United States Patent
Moscaritolo et al.

(10) Patent No.: US 6,901,812 B2
(45) Date of Patent: Jun. 7, 2005

(54) SINGLE-BODY DUAL-CHIP ORTHOGONAL SENSING TRANSIT-TIME FLOW DEVICE

(75) Inventors: Daniel K. Moscaritolo, Thousand Oaks, CA (US); Francis H. Kantor, Newbury Park, CA (US); Fermin A. Sandoval Diaz, Camarillo, CA (US)

(73) Assignee: PTI Technologies, Inc., Oxnard, CA (US)

(*) Notice: Subject to any disclaimer, the term of this patent is extended or adjusted under 35 U.S.C. 154(b) by 0 days.

(21) Appl. No.: 10/334,082

(22) Filed: Dec. 30, 2002

(65) Prior Publication Data

US 2004/0123674 A1 Jul. 1, 2004

(51) Int. Cl.[7] .............................................. G01F 1/66
(52) U.S. Cl. ................... 73/861.27; 73/861.28
(58) Field of Search ..................... 73/861.27, 861.28, 73/861.29

(56) References Cited

U.S. PATENT DOCUMENTS

| | | | | |
|---|---|---|---|---|
| 4,754,650 A | | 7/1988 | Smalling et al. ......... | 73/861.28 |
| 5,090,252 A | | 2/1992 | Tschirner ................. | 73/861.28 |
| 5,372,047 A | * | 12/1994 | Russwurm et al. ...... | 73/861.29 |
| 5,437,194 A | * | 8/1995 | Lynnworth ............... | 73/861.27 |
| 5,644,090 A | * | 7/1997 | Spendel ................... | 73/861.27 |
| 5,650,572 A | * | 7/1997 | Vontz ....................... | 73/861.28 |
| 6,178,827 B1 | | 1/2001 | Feller | |
| 6,345,539 B1 | | 2/2002 | Rawes et al. | |

* cited by examiner

Primary Examiner—Edward Lefkowitz
Assistant Examiner—Corey D. Mack
(74) Attorney, Agent, or Firm—Pillsbury Winthrop

(57) ABSTRACT

An ultrasonic sensor having a pair of ultrasound transducers adapted to be inserted in and being able to perform at a single site of introduction into a duct. The ultrasonic sensor measures a forward ultrasonic path transit time and a second reverse ultrasonic path transit time of ultrasound signals propagating in a fluid. The arrangement being such that a comparison of the signal associated with ultrasound travel in one direction with that of the signal associated with ultrasound travel in the opposite direction enables the flow rate of the fluid in the duct to be determined. The ultrasonic sensor may utilize a reflecting surface on the duct and a reflective surface of an ultrasonic sensor end cap to provide forward and reverse ultrasonic W-shaped paths. In addition, the ultrasonic sensor may also be used to measure the temperature, viscosity, and cavitation effects of a fluid.

90 Claims, 11 Drawing Sheets

A forward traveling signal received at a receiving transducer that varies in strength by 65%

A forward traveling signal received at a receiving transducer that varies in strength by 30%

US 6,901,812 B2

SINGLE-BODY DUAL-CHIP ORTHOGONAL SENSING TRANSIT-TIME FLOW DEVICE

BACKGROUND

1. Technical Field

An embodiment of the present invention generally relates to an ultrasonic flow sensor. More particularly, an embodiment of the present invention relates to a transit-time ultrasonic flow sensor to measure a flow rate, temperature, and cavitation effects.

2. Discussion of the Related Art

The use of the insertion monitoring devices to measure fluid flow rate are restricted by cost and practical problems. For example, in one known insertion metering device, a probe is inserted into a duct through a hole or valve opening in the duct wall. The probe comprises a rod which carries a turbine or electromagnetic sensing element on its tip. The sensing element can take a point measurement indicative of the flow in a part of the duct at a point in time. However, because the flow in the duct is unknown, (varying both in profile across the cross-section of the duct and with time) several measurements must be taken at different points in the cross-section of the duct and at different times. An average can then be built up which would approximate the average flow rate. Its accuracy is limited by the difficulty in aligning the sensing element correctly along the axis of the duct.

In order to obtain reasonably accurate results, the prior art insertion technique requires that measurements be taken at several positions across at least one diameter of the duct. However, it has been found that in practice where flow profiles are distorted, it is necessary to measure across more than one diameter (i.e. two orthogonal diameters) to provide sufficiently accurate results which can be used for calibration. This introduces severe problems when the duct system is installed underground, as it requires that a large chamber must be excavated around the duct in order to allow access for separate circumferentially spaced holes in the duct to be made to allow the orthogonal measurements to be made. Additional problems may be encountered with duct systems installed in aircraft where access may also be difficult.

A further problem with the prior art technique is that the surface area of the rod which supports the sensing element forms a variable blockage in the duct as the element is moved across the diameter. This blockage affects the results by altering the flow profile in the duct and increases turbulence. Furthermore, the process of taking the many measurements required is subject to variability due to the often difficult operating conditions in which the measurements must be made. For example, the insertion probe operator may be working in a water filled, muddy pit which makes it difficult to obtain the various readings with any certain degree of accuracy.

Several different sensor configurations have also been used including: 1) direct measurement of a propagation time of a pulse emitted by a first transducer and received by a second transducer, where the change in time is a function of fluid flow rate; 2) dual "sing-around" sound velocimeters, where the difference in "sing-around" frequency between the velocimeters is a function of the fluid flow rate; 3) sensors producing continuous waves using two widely different high frequency carriers but commonly modulated with another much lower frequency signal, where the phase difference of the modulated signal on the received carriers is a function of the fluid flow rate; and 4) sensors producing bursts of continuous waves, using a single frequency on a pair of transducers, the burst duration being less than the acoustic propagation time between the transducers, where the time between the received transmissions is a function of flow rate.

Transit-time ultrasonic flow sensors, also known as "time-of-flight" ultrasonic flow sensors, detect the acoustic propagation time difference between upstream and downstream ultrasonic transmissions, resulting from movement of flowing fluid, and process this information to derive a fluid flow rate.

Transducers of transit-time ultrasonic flow sensors are most often field mounted. They are generally individually attached to the outside of a pipe. Unlike other types of ultrasonic flow sensors, such as Doppler ultrasonic flow sensors, transit-time ultrasonic flow sensors typically do not require placing a transducer inside a pipe in order to make a flow measurement. However, measurement accuracy may be compromised by a multitude of factors, such as pipe wall integrity, pipe surface condition, and distance between transducers.

Even when the transducers are in contact with the fluid being measured (wetted), the transducers may become misaligned, i.e., disposed at the wrong distance or angle, resulting in measurement error. Thus, sensors having wetted transducers are typically equipped with supporting electronics that include sophisticated diagnostics for confirming proper installation and operation. Consequently, such sensors are relatively expensive and have a reputation for occasionally producing erroneous measurements.

DETAILED DESCRIPTION

Reference in the specification to "one embodiment", "an embodiment", or "another embodiment" of the present invention means that a particular feature, structure or characteristic described in connection with the embodiment is included in at least one embodiment of the present invention. Thus, appearances of the phrase "in one embodiment" or "according to an embodiment" appearing in various places throughout the specification are not necessarily all referring to the same embodiment. Likewise, appearances of the phrase "in another embodiment" or "according to another embodiment" appearing in various places throughout the specification are not necessarily referring to different embodiments.

Figure 1:
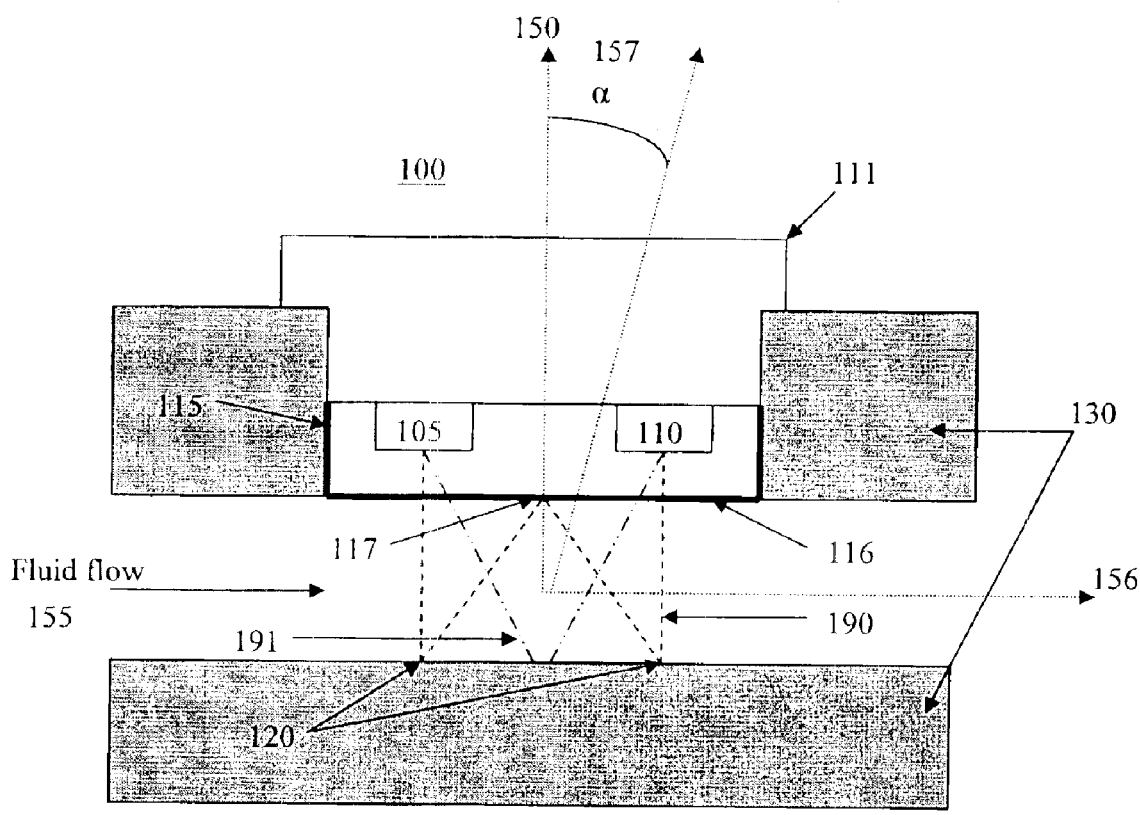
FIG. 1 illustrates an ultrasonic flow sensor and a reflecting surface according to an embodiment of the present invention.

Referring to FIG. 1, embodiments of the present invention are directed to an ultrasonic sensor 100 adapted to be inserted into a duct 130, the ultrasonic sensor 100 having ultrasound transducers 105, 110 and being able to perform at a single site of introduction into the duct 130. The flow sensor measures a forward ultrasonic path transit time having a component of travel of ultrasound in a forward direction relative to a fluid flow 155, i.e., an axial direction relative to the region of the duct 130 where the sensor 100 is inserted, and also being able to perform a second reverse path transit time measurement having a component of travel of ultrasound in a second axial direction opposite to the first axial direction, the arrangement being such that a comparison of the signal associated with ultrasound travel in one axial direction with that of the signal associated with ultrasound travel in the opposite axial direction enables the flow rate of fluid in the duct to be determined.

In addition, the ultrasonic sensor 100 may also be used to measure the temperature of a moving or stationary fluid by using either the transit time measurement in the forward direction or the transit time measurement in the reverse direction. This results from the fact that there exists a linear relationship between the wave speed of an acoustic signal in a fluid and the temperature of the fluid. The acoustic wave speed is equal to the distance traveled divided by the transit time of an acoustic signal, wherein the distance traveled being a distance between the transmitter and receiver, and the transit time being a parameter measured by the ultrasonic sensor 100. The temperature of a fluid may be calculated by using the following equation:

$$T_2 = -1/M(V_2-V1) + T_1$$

Figure 10:
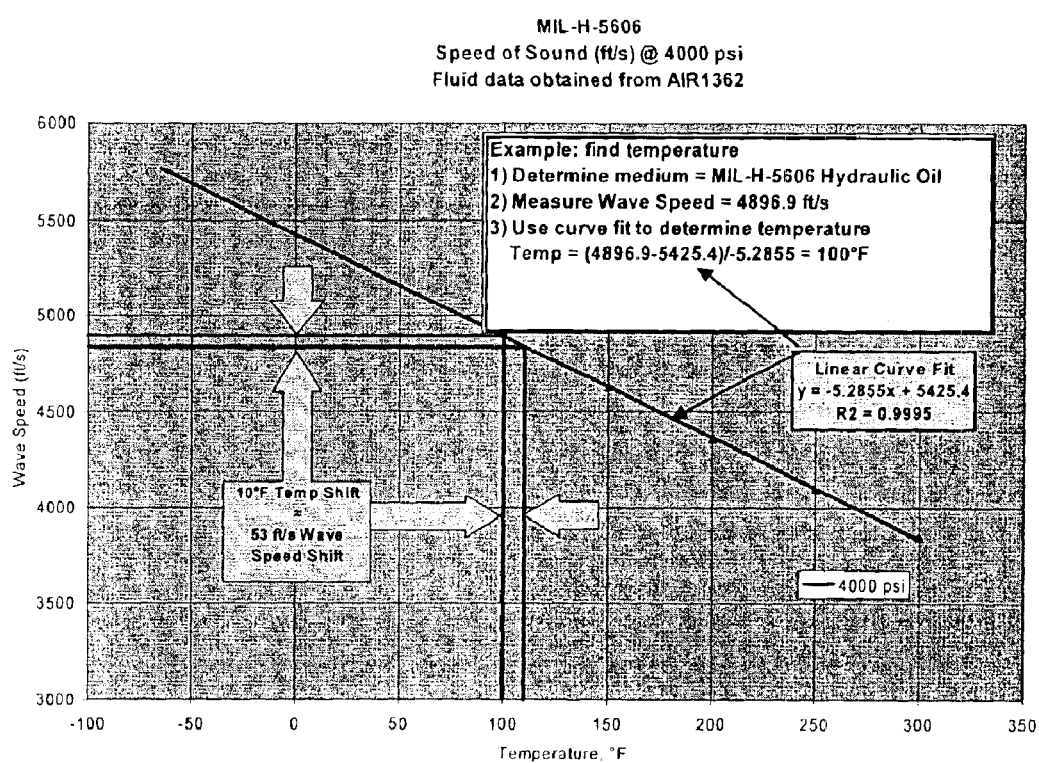
FIG. 10 illustrates a graph of wave speed versus temperature.

$T_2$=Temperature of a fluid at Acoustic Wave Velocity $V_2$
$T_1$=Temperature of a fluid at Acoustic Wave Velocity $V_1$
M=fluid medium dependent Constant Referring to FIG. 10, to measure the temperature of a known fluid, for example MIL-H-5606 Hydraulic Oil, a graph is created plotting wave speed versus temperature of the fluid based on data obtained experimentally for various wave speed and temperature. Using the equation for a line Y=mX+B where Y in this case equals a measured wave speed value, m equals the slope of the line, X equals the temperature to be determined, and B equals the Y intercept point. Solving for X the temperature:

$$X=(Y-B)/m$$

$$X=(4896.9-5425.4)/-5.2855=100° \text{ F.}$$

The ultrasonic sensor 100 may also be used to measure the viscosity of a moving fluid by using either the transit time measurement in the forward direction or the transit time measurement in the reverse direction. As discussed above, the temperature may be calculated using the transit time. The viscosity of a fluid is proportional to the temperature of the fluid. Therefore, using the appropriate calculation, the viscosity may be calculated using the temperature measurement of the fluid.

The viscosity of a fluid may be calculated by using the following equation:

$$V=KT$$

Figure 11:
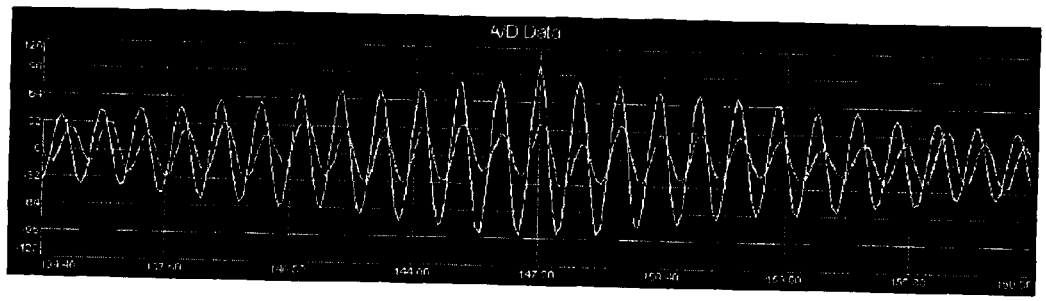
FIG. 11 illustrates a measurement of cavitation effects.
Figure 11:
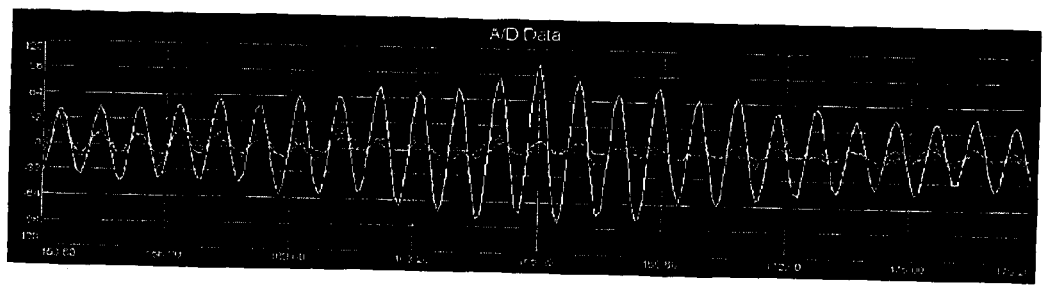

K=Constant factor for a particular fluid
T=Temperature of a fluid at Acoustic Wave velocity Finally, the ultrasonic sensor 100 may also provide a measurement of the cavitation of a moving fluid. Air entrainment (cavitation) may be indicated by erratic signal patterns and reduced received signal strength. Changes in signal strength for a given flow rate indicates a 2-phase flow, i.e., the signal strength is proportional to the % of gas bubbles in a flowing fluid. The % of gas bubbles in a flowing fluid indicates the degree of cavitation. For example, as illustrated in FIG. 11, a forward traveling signal received at a receiving transducer that varies in strength from 65% to 30% indicates cavitation effects, wherein the variation in the signal strength indicates the degree of cavitation.

The ultrasonic sensor 100 requires at least one ultrasound transmitter and detector pair 105, 110 for each forward or reverse measurement. Embodiments of the present invention use the same transducer 105, 110 to transmit and detect. Therefore, two transducers 105, 110 each capable of transmitting and detecting may measure both the forward and the reverse transit times.

Embodiments of the present invention may use piezoelectric transducers to generate or receive the acoustic signals. Piezoelectric transducers, in the case of a receiver, convert force or mechanical stress into electric charge which in turn may be converted into a voltage. Conversely, if a voltage is applied to a piezoelectric transducer the resultant electric field will cause a deformation of the crystal material to generate an acoustic signal. The frequency range of the ultrasound signals may be up to 5 Mhz.

The first transducer 105 may comprise the transmitter of one forward path transmitter/receiver pair and the receiver of another reverse transmitter/receiver pair. The second transducer 110 may comprise the receiver of the forward transmitter/receiver pair and the transmitter of the reverse transmitter/receiver pair.

Figure 4:
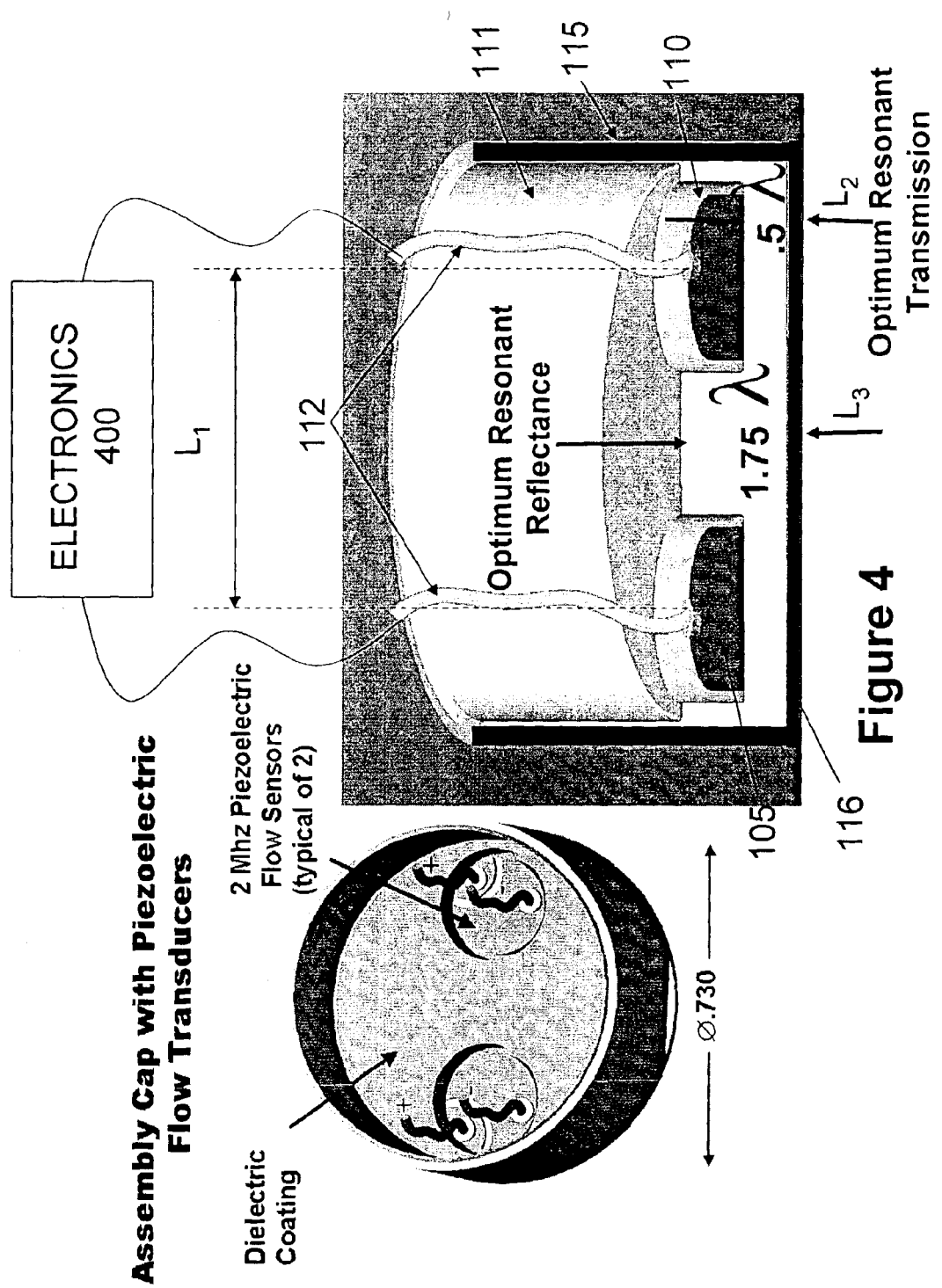
FIG. 4 illustrates an ultrasonic flow sensor including an end cap according to an embodiment of the present invention.

Referring to FIG. 4, the two transducers 105, 110 are mounted and spaced apart by a distance $L_1$ within a housing 111. An end cap 115 is hermetically sealed to the housing 111 to enclose and isolate the transducers 105, 110 from the flowing fluid 155. A distance $L_2$ between the end cap surface 116 in contact with the flowing fluid 155 and the emitting surface of the transducers 105, 110 is equal to $(n/2)\lambda$, where $\lambda$ is a wavelength of the transmitted signal, and n is an integer. For example, resonance transmission of an acoustic signal occurs for n=1 and $L_2=\frac{1}{2}\lambda$. A distance $L_3$ between the end cap surface 116 in contact with the flowing fluid 155 and a point on the housing 111 located between the transducers 105, 110 is equal to $(\frac{3}{4}+n/2)\lambda$, where $\lambda$ is a wavelength of the transmitted signal, and n is an integer. For example, resonance reflection of an acoustic signal occurs for n=2 and $L_3=1.75\lambda$.

Referring to FIG. 1, the ultrasonic sensor 100 is adapted to measure the transit times of an ultrasonic pulse in the forward and reverse directions of a W shaped path 190 or a V shaped path 191. The transit time difference in the forward and reverse directions of ultrasound travel along the W paths 190 or V paths 191 may be used to calculate the flow rate of fluid in the duct 130. In addition, the temperature, viscosity, and cavitation of the fluid may be calculated using the transit time in the forward direction or the transit time in the reverse direction.

To calculate the flow rate from the transit times along each W shaped 190 or V shaped 191 transmission path, the difference between the transit times in the directions along the paths in the forward and reverse times may be used. An approximately proportional relationship exists between transit time and flow. For example, for a V shaped path:

$$V = K*D/\sin 2\Theta * 1/(T_o - \tau)^2 * \Delta T$$

Where:
V=mean velocity of flowing fluid
K=constant
D=inner diameter of pipe or duct
Θ=incident angle of ultrasonic signal
$T_o$=Zero flow transit time
$\Delta T = T_2 - T_1$
$T_1$=transit time of acoustic signal from upstream transducer to downstream transducer
$T_2$=transit time of acoustic signal from downstream transducer to upstream transducer
τ=transit time of acoustic signal through pipe or duct wall and lining In addition to the above formula, the flowing fluid velocity ($V_f$) can be determined by the following equation:

$$V_f = K dt / T_L$$

where K is a calibration factor for the volume and time units used, dt is the time differential between upstream and downstream transit times, and $T_L$ is the zero-flow transit time. Theoretically, transit-time ultrasonic meters can be very accurate (inaccuracy of ±0.1% of reading has been reported). The error in these measurements is limited by both the ability of the signal processing electronics to determine the transit time and by the degree to which the electrical signal used to generate the acoustic signal is constant i.e, a sonic velocity (C) that is constant. The speed of sound in the fluid is a function of the stability of the electrical signal used to generate the acoustic signal, the density of the fluid and the temperature of the fluid.

Therefore, relatively simple electronic circuitry may be employed to extract flow data, temperature data, and cavitation data. For example, an electronic transmitting and receiving device 400 may be used, connected to the transducers 105, 110 via wires 112 which pass through the housing 111 and may be sealed by epoxy. The electronics 400 may be connected after the ultrasonic sensor 100 is inserted (see FIG. 4).

Preferably the ultrasonic sensor 100 i.e., the transducer pair 105, 110 contained within the end cap 115, are adapted to be flush with a wall of the duct 130 in use. This reduces the disturbance of the fluid flow to provide a higher accuracy measurement of the fluid flow rate (see also FIG. 5).

Because the ultrasound path has at least two path environments (forward and reverse W paths 190, or forward and reverse V paths 191) and because the ultrasound does travel through the fluid in the duct axially (at least with an axial component) rather than a single point measurement of flow being obtained as in the prior art, the fluid flow at several different points on the ultrasound path affects the signal that is measured. This provides a degree of built-in averaging or integration which eliminates the need to obtain many measurements at different points in the cross-section of the duct. Therefore, an amount of integration of the signal is inherently present, which provides a more accurate indication of flow rate than single point measurements. In addition, because there is no need to make measurements at different points, the sensor does not need to be moved which simplifies the operation. A longer acoustic path provides a more accurate indication of flow rate. Therefore, a W shaped path provides a more accurate indication of flow rate than does a V shaped path.

Referring to FIG. 1, preferably, the ultrasonic sensor 100 is adapted to use the reflection of the ultrasound off of a reflecting surface 120 on a wall of the duct 130 and a reflective surface 116 of the end cap 115 to create the forward W shaped ultrasonic path 190 and the reverse W shaped ultrasonic path 190. The ultrasonic paths are beams of ultrasound. The ultrasonic sensor 100 operates to take the forward and reverse ultrasonic path measurements from a stationary position. In addition, because there is no need to make measurements at different points, the sensor does not need to be moved which simplifies the operation.

In embodiments of the present invention the first 105 and second 110 transducers may be oriented at an angle α 157 relative to a axis 150 orthogonal to a central axis 156 of the duct 130. The choice of length $L_1$ between the first transducer 105 and second transducer 110 is dependent upon the diameter of the duct and orientation angle α 157 of the transducers 105, 110. In use, signals are transmitted along paths between the transducers 105, 110, and in order for the first and second transducers 105, 110 to communicate when used in, for example, a circular duct 130, the relation $L_1 = 3 \tan \alpha\, D$ is preferable, where D is the duct diameter and α 157 is the angle of inclination of the acoustic paths relative to axis 150 orthogonal to the central axis 156 of the duct 130. This relationship arises because of the angle of reflection of the signal from the duct wall or walls.

As an example, given a duct diameter D=10 inches, if the angle of inclination α 157 is one degree, the signal path is one degree relative to axis 150 orthogonal to the central axis 156 of the duct 130, and the separation $L_1$ between the first transducer 105 and second transducer 110 is equal to approximately ½ inch. From the above, the length L1 should be correctly set for different duct diameters and should be adjustable if the sensor assembly is to be suitable for use with any duct diameter.

FIG. 1 illustrates a W path according to a first embodiment of the present invention. The ultrasonic sensor 100 may comprise first and second transducers 105, 110 with a reflecting surface 120 located on a duct 130 wall opposite the transducers. The transducers 105, 110 are oriented at an angle α 157 approximately equal to zero relative the axis 150 orthogonal to the central axis 156 of the duct 130. That is, the initial path is in effect orthogonal to the duct axis. However, due to the diffraction of the acoustic signal as it leaves a transducer, the pair of transducers 105, 110 need not be absolutely adjacent one another (i.e. L≠0). In this embodiment, the first and second transducers 105, 110 launch the acoustic signal at an angle α 157 approximately equal to zero, the acoustic signal impinges upon a reflecting surface 120 located on the duct 130 wall opposite the transducers 105, 110. Specifically, the first transducer 105 launches a forward traveling acoustic signal at an angle α 157 approximately equal to zero into the duct 130 which propagates through a forward traveling fluid 155 contained in the duct 130 until the acoustic signal reflects off of the reflecting surface 120. A portion of the acoustic signal is then re-directed back towards the flow sensor 100 until it makes a second reflection off of the end cap surface 116. Specifically, a portion of the acoustic signal reflects at a reflection point 117 on the end cap 115 surface located midway between the central axis of the first 105 transducer and the central axis of the second 110 transducer. The acoustic signal is then re-directed back towards the reflecting surface 120 to make a third reflection off of the reflecting surface 120. Again, a portion of the acoustic signal is then re-directed back towards the flow sensor 100 until it then passes through the end cap surface 116 to reach the second transducer 110 also oriented at an angle α 157 equal to zero.

The reverse W path 190 is similar. The second transducer 110 launches a reverse traveling acoustic signal into the duct 130 which propagates through a forward traveling fluid 155 contained in the duct 130 until the acoustic signal reflects off of the reflecting surface 120. The acoustic signal is then re-directed back towards the flow sensor 100 until it makes a second reflection off of the end cap surface 116. This reflection takes place at the reflection point 117 on the end cap surface 116 located midway between the central axis of the first 105 transducer and the central axis of the second 110 transducer. The acoustic signal is then re-directed back towards the reflecting surface 116 to make a third reflection off of the reflecting surface 116. Again, the acoustic signal is then re-directed back towards the flow sensor 100 until it then passes through the end cap surface 116 to reach the first transducer 105.

Figure 2:
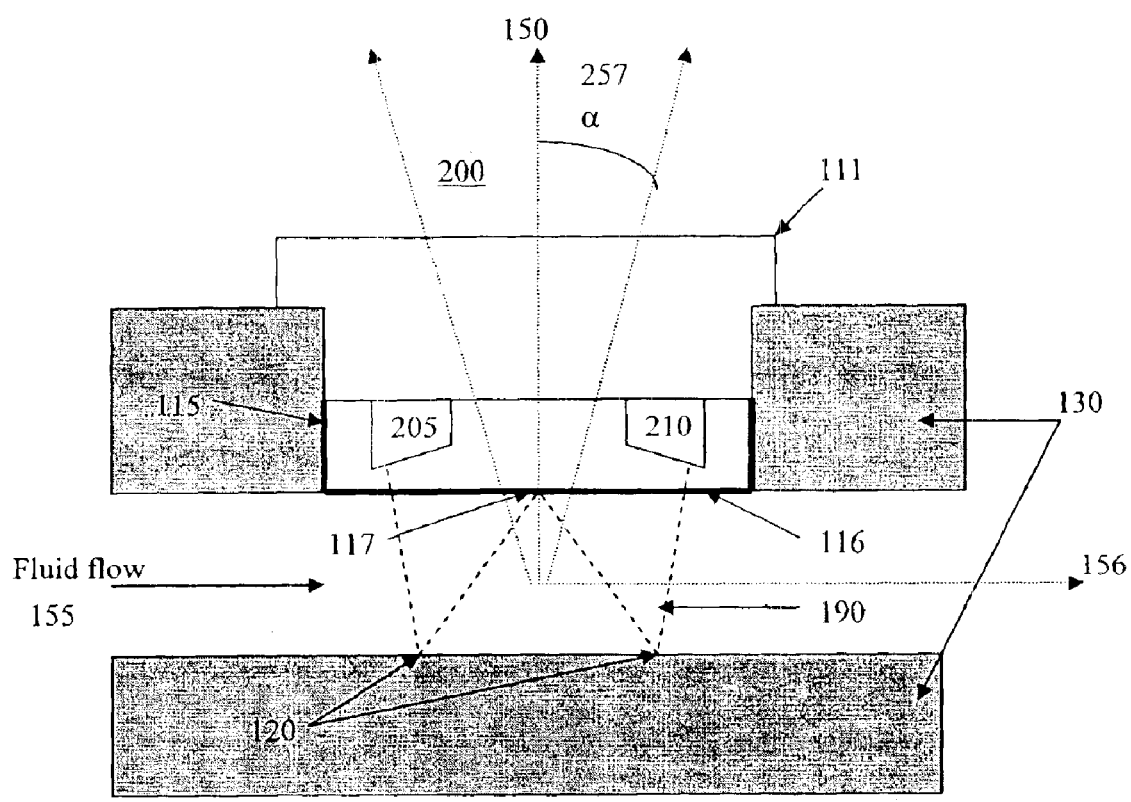
FIG. 2 illustrates an ultrasonic flow sensor with angled transducers and a reflecting surface according to an embodiment of the present invention.

FIG. 2 illustrates an alternative embodiment of the present invention. The first 205 and second 210 transducers are oriented at an angle α 257 relative to the axis 150 orthogonal to the central axis 116 of the duct 130. The first transducer 205 launches a forward traveling acoustic signal at an angle α 257 into a duct 130 which propagates through a forward traveling fluid 155 contained in the duct 130 until the acoustic signal reflects off of a reflecting surface 120 located on a duct 130 wall opposite the transducers 205, 210 at a reflection angle approximately equal to α 257. The acoustic signal is then re-directed back towards the flow sensor 200 until it makes a second reflection off of the end cap surface 116. This reflection takes place at a reflection point 117 on the end cap 115 located midway between the central axis of the first 205 transducer and the central axis of the second 210 transducer and also occurs at an angle α 257. The acoustic signal is then re-directed back towards the reflecting surface 120 to make a third reflection off of the reflecting surface 120. Again, the acoustic signal is then re-directed by the reflecting surface 120 back towards the flow sensor 200 until it then passes through the end cap surface 116 to reach the second transducer 210 also oriented at an angle α 257.

The reverse W path 190 is similar. The second transducer 210 launches a reverse traveling acoustic signal at an angle α 257 into the duct which propagates through the forward traveling fluid 155 contained in the duct 130 until the acoustic signal reflects off of the reflecting surface 120. The acoustic signal is then re-directed back towards the flow sensor 200 until it makes a second reflection off of the end cap surface 116. This reflection takes place at the reflection point 117 located on the end cap 115 midway between the central axis of the first 205 transducer and the central axis of the second 210 transducer. The acoustic signal is then re-directed back towards the reflecting surface 120 to make a third reflection off of the reflecting surface 120. Again, the acoustic signal is then re-directed back towards the flow sensor 200 until it then passes through the end cap surface 116 to reach the first transducer 205.

Figure 3:
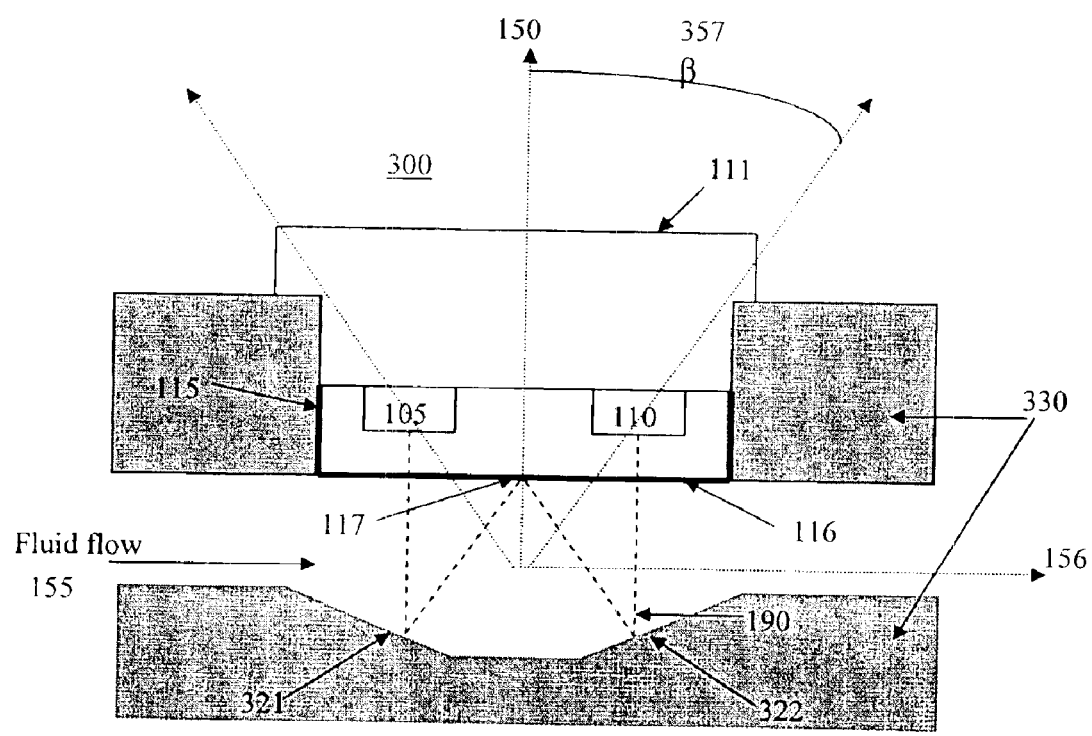
FIG. 3 illustrates an ultrasonic flow sensor, a first reflecting surface, and a second reflecting surface according to an embodiment of the present invention.

FIG. 3 illustrates a further embodiment of the present invention. The ultrasonic flow sensor 300 may comprise first 105 and second 110 transducers with first 321 and second 322 reflecting surfaces, where the transducers 105, 110 are oriented at and an angle α approximately equal to zero relative the axis 150 orthogonal to the central axis 156 of the duct 330, the initial path is in effect orthogonal to the duct axis 156. However, the pair of transducers 105, 110 need not be adjacent one another (i.e. $L_1 \neq 0$). In this embodiment, the first 105 and second 110 transducers launch acoustic signals at an angle α approximately equal to zero, the acoustic signals impinge upon first 321 and second 322 reflecting surfaces each oriented at an angle β 357 relative the axis 150 orthogonal to the central axis 156 of the duct 330.

Specifically, the first transducer 105 launches a forward traveling acoustic signal at an angle α approximately equal to zero into the duct 330 which propagates through a forward traveling fluid 155 contained in the duct 330 until the acoustic signal reflects off of a first reflecting surface 321 oriented at an angle approximately equal to β 357. The acoustic signal is then re-directed back towards the flow sensor 300 until it makes a second reflection off of the end cap surface 116. This reflection takes place at the reflection point 117 located on the end cap 115 midway between the central axis of the first 105 transducer and the central axis of the second 110 transducer and also occurs at an angle β 357. The acoustic signal is then re-directed back towards a second reflecting surface 322 to make a third reflection. The acoustic signal reflects off of the second reflecting surface 322 also oriented at an angle approximately equal to β 357. Again, the acoustic signal is then re-directed back towards the flow sensor 300 until it then passes through the end cap surface 116 to reach the second transducer 110 also oriented at an angle α equal to zero.

The reverse W path 190 is similar. The second transducer 110 launches a reverse traveling acoustic signal into a duct 330 which propagates through the forward traveling fluid 155 contained in the duct 330 until the acoustic signal reflects off of the second reflecting surface 322. The acoustic signal is then re-directed back towards the flow sensor 300 until it makes a second reflection off of the end cap surface 116. This reflection takes place at the reflection point 117 located on the end cap 115 midway between the central axis of the first 105 transducer and the central axis of the second 110 transducer. The acoustic signal is then re-directed back towards the first reflecting surface 321 to make a third reflection. Again, the acoustic signal is then re-directed back towards the flow sensor 300 until it then passes through the end cap surface 116 to reach the first transducer 105.

The reflecting surface 120 as shown in FIG. 1 and FIG. 2, as well as the first reflecting surface 321 and second reflecting surface 322 as shown in FIG. 3, may be machined or formed into an interior surface during the initial fabrication of e.g., a duct, a manifold, or a pipe. Alternatively, the reflecting surface 120, or the first reflecting surface 321 and second reflecting surface 322 may be machined into an interior surface of e.g., an existing duct, manifold, or pipe in a "retrofit" process.

Figure 5:
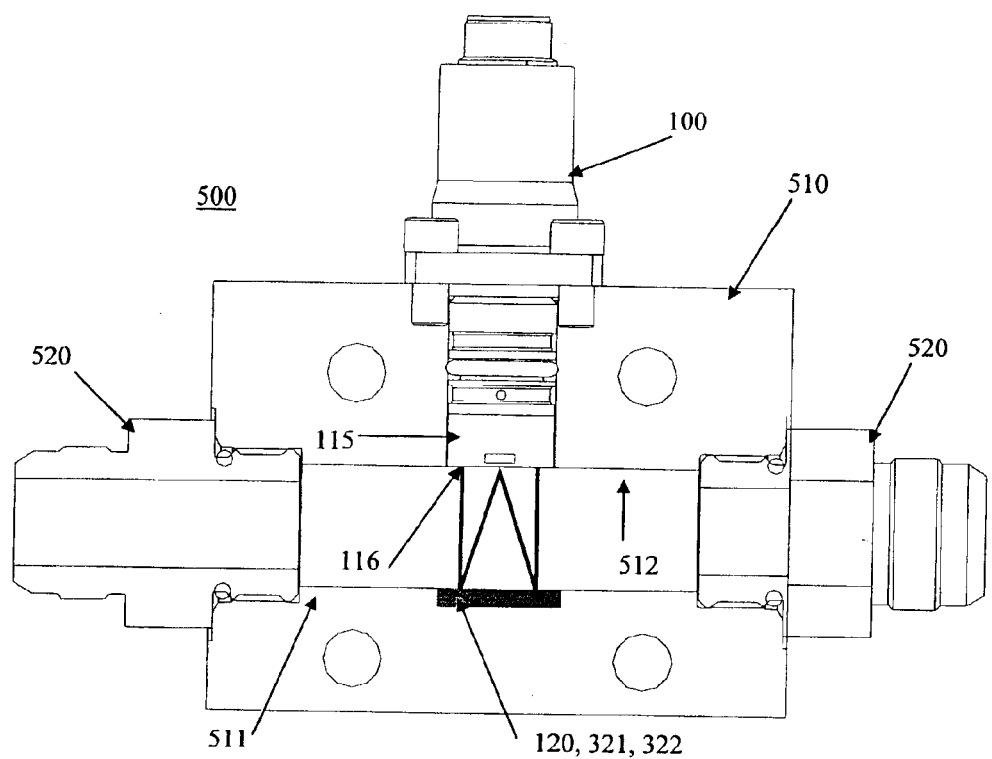
FIG. 5 illustrates an ultrasonic sensor system according to an embodiment of the present invention.

FIG. 5 illustrates an ultrasonic sensor system 500 consisting of a duct assembly 510, an ultrasonic sensor 100, a reflecting surface 120, or first reflecting surface 321 and second reflecting surface 322, and connectors 520. Ultrasonic sensor system 500 may be adaptable to an existing fluid system. Connectors 520 may be any type of mating connector that will provide a fluid tight seal, for example, with an existing fluid system. The reflective surface 116 of the end cap 115 is flush with an interior surface 512 of the duct assembly 510. This prevents any disturbance of a fluid flowing through the duct assembly 510. Reflecting surface 120, or first reflecting surface 321 and second reflecting surface 322, may be machined into an interior surface 511 of the duct assembly 510 during the fabrication of duct assembly 510.

Figure 6:
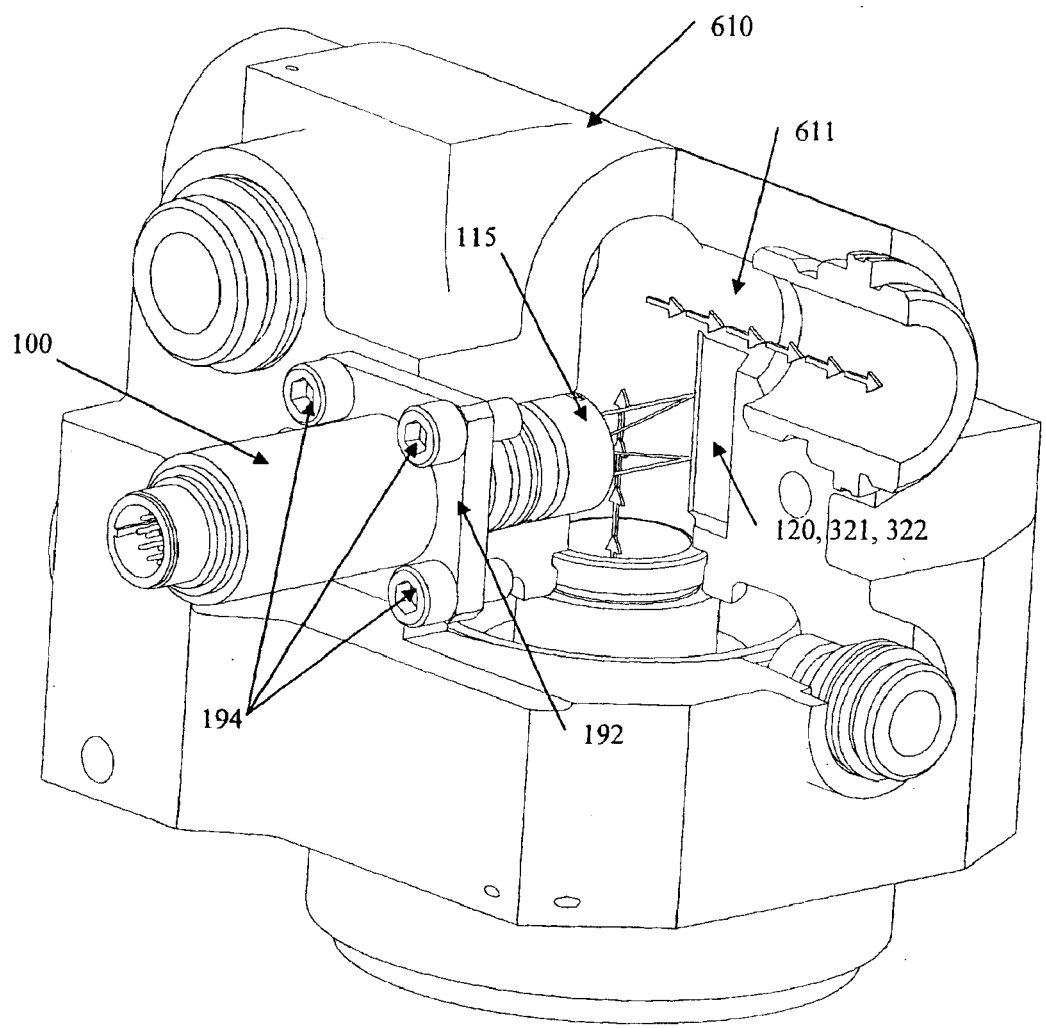
FIG. 6 illustrates an ultrasonic sensor installed into an existing duct assembly according to an embodiment of the present invention.
Figure 7:
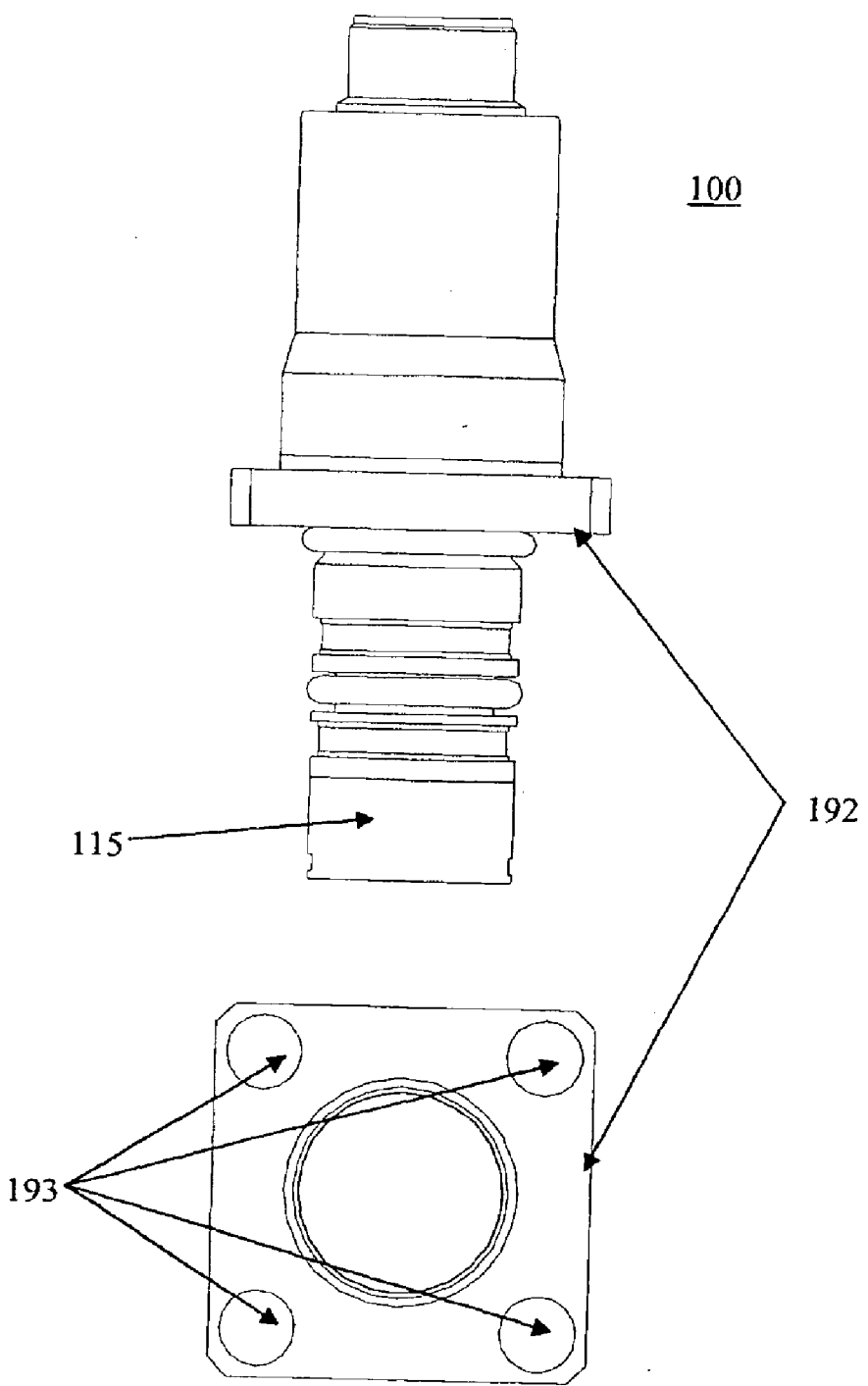
FIG. 7 illustrates an ultrasonic flow sensor including an end cap according to an embodiment of the present invention.

FIG. 6 illustrates an ultrasonic sensor 100 installed into an existing duct assembly 610. Reflecting surface 120 or first reflecting surface 321 and second reflecting surface 322 may be machined into an interior surface 611 of duct assembly 610 during a "retrofit" installation of ultrasonic sensor 100 into duct assembly 610. Referring to FIG. 6 and FIG. 7, ultrasonic sensor 100 may include a standardized mounting flange 192 including four mounting holes 193 to accommodate four mounting screws 194. The standardized mounting flange 192 replicates the mounting flange used on existing standardized fluid sensors. This aids in the retrofit process wherein an existing standardized fluid sensor may be removed and replaced by an ultrasonic sensor 100. The end cap 115 of ultrasonic sensor 100 fitting into the existing hole in the duct assembly 610 after removal of the existing standardized fluid sensor.

Figure 8:
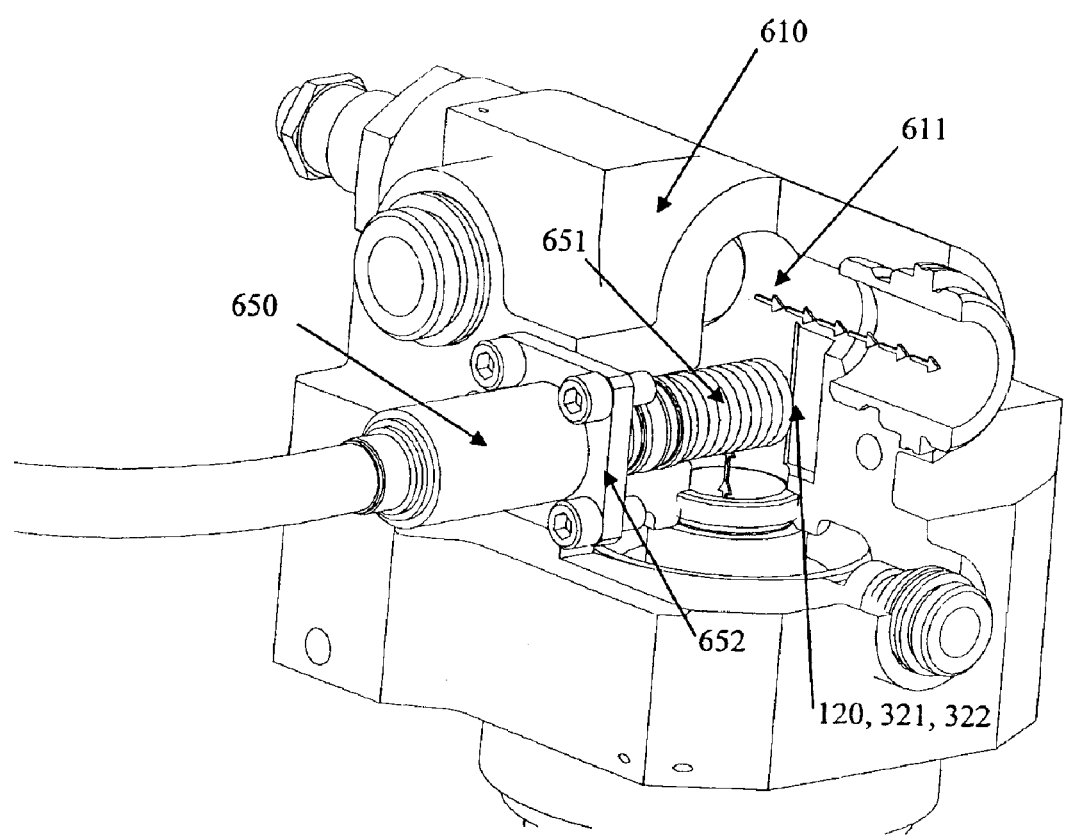
FIG. 8 illustrates a retrofit assembly including a boot structure with a mounting flange according to an embodiment of the present invention.

Referring to FIG. 8, the retrofit installation may require the machining of a reflecting surface 120 or first reflecting surface 321 and second reflecting surface 322 into an interior surface 611 of duct assembly 610. A retrofit assembly 650 that may include precision machining equipment and a boot structure 651 with a mounting flange 652 mounts to the existing hole pattern in the duct assembly 610. The boot structure 651 serves to contain the metal shards created during a machining process preventing contamination of the existing duct assembly 610 during the retrofit process. Accurate alignment of the retrofit assembly 650 may be achieved by using the mounting flange 652 in conjunction with the existing mounting holes in the duct assembly 610. A substantially flat reflecting surface 120 or substantially flat first reflecting surface 321 and second reflecting surface 322 may be machined into an interior surface 611 of duct assembly 610 using precision machining equipment that may be contained within the retrofit assembly 650.

Figure 9:
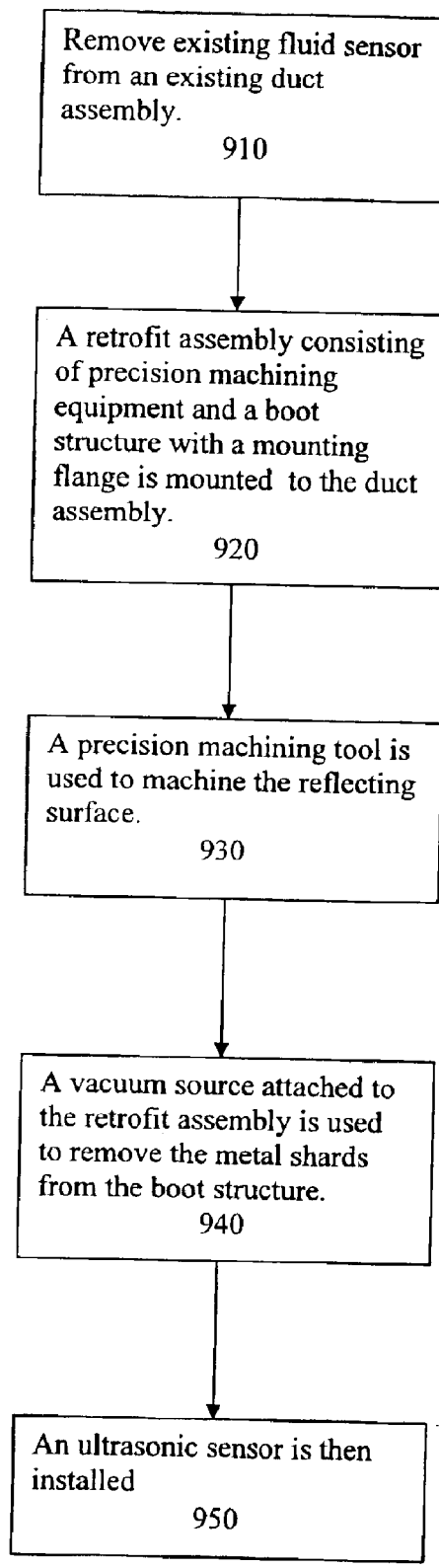
FIG. 9 illustrates a flow chart diagram for a method of installing an ultrasonic sensor into an existing duct assembly according to an embodiment of the present invention.

FIG. 9 illustrates a flow chart diagram for a method of installing an ultrasonic sensor into an existing duct assembly. An existing fluid sensor is first removed 910 from an existing duct assembly. A retrofit assembly 650 that may contain precision machining equipment and a boot structure 651 with a mounting flange 652 is mounted 920 to the existing hole pattern in the duct assembly 610 using four bolts through the four bolt mounting flange 652 into the existing four mounting holes. The precision machining equipment that may be contained within the retrofit assembly is inserted 930 through the existing hole in the duct assembly 610 to machine the reflecting surface 120, 321, 322. Any metal shards created during the machining process are contained within the boot structure 651. The precision machining equipment is withdrawn from the existing hole in the duct assembly 610 and a vacuum source that may also be contained within the retrofit assembly 650 is used to remove 940 the metal shards from the boot structure 651. An ultrasonic sensor 100 is then installed 950. The end cap 115 of ultrasonic sensor 100 fitting into the existing hole in the duct assembly 610. The standardized mounting flange 192 including four mounting holes 193 accommodates four mounting screws 194 secured to the duct assembly 610.

While the description above refers to particular embodiments of the present invention, it will be understood that many modifications may be made without departing from the spirit thereof. The accompanying claims are intended to cover such modifications as would fall within the true scope and spirit of an embodiment of the present invention. The presently disclosed embodiments are therefore to be considered in all respects as illustrative and not restrictive, the scope of an embodiment of the invention being indicated by the appended claims, rather than the foregoing description, and all changes that come within the meaning and range of equivalency of the claims are therefore intended to be embraced therein.

What is claimed is:

1. An ultrasonic flow sensor, comprising:
   a first transducer to transmit a signal;
   a second transducer to receive the signal; and
   at least one end cap enclosing and isolating the first transducer and the second transducer from a fluid, the end cap having a reflective surface located in contact with the fluid, the first transducer and the second transducer spaced apart in a direction parallel to a direction of fluid flow.

2. The ultrasonic flow sensor according to claim 1, wherein the signal transmitted by the first transducer reflects off of the reflective surface.

3. The ultrasonic flow sensor according to claim 2, wherein the signal transmitted by the first transducer reflects off of a reflecting surface on a duct back to the reflective surface of the end cap.

4. The ultrasonic flow sensor according to claim 3, wherein the signal transmitted by the first transducer approximately traverses a W shaped path that extends from the first transducer to the reflecting surface to the reflective surface to the reflecting surface to the second transducer.

5. The ultrasonic flow sensor according to claim 3, wherein the reflecting surface is located on a wall of the duct located opposite the first transducer and the second transducer and includes at least one angled surface.

6. The ultrasonic flow sensor according to claim 3, wherein the reflecting surface includes a first angled surface and a second angled surface.

7. The ultrasonic flow sensor according to claim 1, wherein a distance between the reflective surface and a point on an inner end cap surface located between the first transducer and the second transducer is approximately equal to $(\frac{3}{4}n/2)\lambda$, where $\lambda$ is a wavelength of the transmitted signal, and n is an integer.

8. The ultrasonic flow sensor according to claim 1, wherein a distance between a first transducer surface or a second transducer surface and an end cap surface is approximately equal to $(n/2)\lambda$, where $\lambda$ is a wavelength of the transmitted signal, and n is an integer.

9. The ultrasonic flow sensor according to claim 1, wherein the signal travels generally in the direction of the fluid flow and the signal is used to measure a rate of the fluid flow, a temperature of the fluid flow, and a cavitation of the fluid flow.

10. The ultrasonic flow sensor according to claim 1, wherein the signal travels generally in a direction opposite the direction of the fluid flow and the signal is used to measure a rate of the fluid flow, a temperature of the fluid flow, and a cavitation of the fluid flow.

11. The ultrasonic flow sensor according to claim 1, wherein the first transducer and the second transducer are oriented at an angle relative to an axis orthogonal to a central axis of a duct.

12. An ultrasonic flow detection apparatus, comprising:
    a first transducer to transmit a signal;
    a second transducer to receive the signal;
    at least one end cap separating the first transducer and the second transducer from a fluid, the end cap having a reflective surface located in contact with the fluid; and
    a reflecting surface located opposite said reflective surface to reflect the signal to the reflective surface.

13. The ultrasonic flow detection apparatus according to claim 12, wherein the signal transmitted by the first transducer reflects off of the reflective surface.

14. The ultrasonic flow detection apparatus according to claim 13, wherein the signal transmitted by the first transducer reflects off of the reflective surface of the end cap back to the reflecting surface.

15. The ultrasonic flow detection apparatus according to claim 12, wherein the signal transmitted by the first transducer approximately traverses a W shaped path that extends from the first transducer to the reflecting surface to the reflective surface to the reflecting surface to the second transducer.

16. The ultrasonic flow detection apparatus according to claim 12, wherein a distance between the reflective surface and a point on an inner end cap surface located between the first transducer and the second transducer is approximately equal to $(\frac{3}{4}n/2)\lambda$, where $\lambda$ is a wavelength of the transmitted signal, and n is an integer.

17. The ultrasonic flow detection apparatus according to claim 12, wherein a distance between a first transducer surface or a second transducer surface and an end cap surface is approximately equal to $(n/2)\lambda$, where $\lambda$ is a wavelength of the transmitted signal, and n is an integer.

18. The ultrasonic flow detection apparatus according to claim 12, wherein the signal travels generally in a direction of a fluid flow and the signal is used to measure a rate of the fluid flow, a temperature of the fluid flow, and a cavitation of the fluid flow.

19. The ultrasonic flow detection apparatus according to claim 12, wherein the signal travels generally in a direction opposite a direction of a fluid flow and the signal is used to measure a rate of the fluid flow, a temperature of the fluid flow, and a cavitation of the fluid flow.

20. The ultrasonic flow detection apparatus according to claim 12, wherein the first transducer and the second transducer are oriented at an angle relative to an axis orthogonal to a central axis of a duct.

21. The ultrasonic flow detection apparatus according to claim 12, wherein the reflecting surface is located on a wall of the duct located opposite the first transducer and the second transducer and includes at least one angled surface.

22. The ultrasonic flow detection apparatus according to claim 12, wherein the reflecting surface includes a first angled surface and a second angled surface.

23. An ultrasonic flow detection apparatus, comprising:
a first transducer to transmit a signal;
a second transducer to receive the signal, the first transducer and the second transducer being enclosed and isolated from a fluid; and
a reflecting surface to reflect the signal toward a reflective surface, wherein the reflecting surface is located opposite said reflective surface, the reflective surface lies along an axis approximately half-way between the first transducer and the second transducer, a path of the signal extends generally along a longitudinal axis of a duct parallel to a direction of fluid flow, the path extends from the first transducer to the reflecting surface to the reflective surface to the reflecting surface to the second transducer.

24. The ultrasonic flow detection apparatus according to claim 23, further including at least one end cap to separate the first transducer and the second transducer from a fluid.

25. The ultrasonic flow detection apparatus according to claim 24, wherein a distance between the reflective surface and a point on an inner end cap surface located between the first transducer and the second transducer is approximately equal to $(\frac{3}{4}n/2)\lambda$, where $\lambda$ is a wavelength of the signal, and n is an integer.

26. The ultrasonic flow detection apparatus according to claim 25, wherein a distance between a first transducer surface or a second transducer surface and an end cap surface is approximately equal to $(n/2)\lambda$, where $\lambda$ is a wavelength of the signal, and n is an integer.

27. The ultrasonic flow detection apparatus according to claim 25, wherein the reflective surface is located on an end cap surface.

28. The ultrasonic flow detection apparatus according to claim 23, wherein the signal travels generally in the direction of the fluid flow and the signal is used to measure a rate of the fluid flow, a temperature of the fluid flow, and a cavitation of the fluid flow.

29. The ultrasonic flow detection apparatus according to claim 23, wherein the signal travels generally in a direction opposite the direction of the fluid flow and the signal is used to measure a rate of the fluid flow, a temperature of the fluid flow, and a cavitation of the fluid flow.

30. The ultrasonic flow detection apparatus according to claim 23, wherein the first transducer and the second transducer are oriented at an angle relative to an axis orthogonal to a central axis of a duct.

31. The ultrasonic flow detection apparatus according to claim 23, wherein the reflecting surface is located on a wall of the duct located opposite the first transducer and the second transducer and includes at least one angled surface.

32. The ultrasonic flow detection apparatus according to claim 23, wherein the reflecting surface includes a first angled surface and a second angled surface.

33. An ultrasonic sensor system, comprising:
a duct for providing a flow path for a fluid in a flow direction; and
an ultrasonic flow sensor sealingly coupled to the duct, including:
a first transducer to transmit a signal,
a second transducer to receive the signal, and
at least one end cap to separate the first transducer and the second transducer from the fluid, the end cap having a reflective surface located in contact with the fluid to receive the signal from a reflecting surface located opposite said reflective surface, a path of the signal extends generally along a longitudinal axis of the duct parallel to a direction of fluid flow.

34. The ultrasonic sensor system according to claim 33, further including the reflecting surface being located on a duct wall to reflect the signal.

35. The ultrasonic sensor system according to claim 34, wherein the reflecting surface includes a first angled surface and a second angled surface.

36. The ultrasonic sensor system according to claim 33, wherein the path of the signal extends from the first transducer to the reflecting surface to a reflective surface to the reflecting surface to the second transducer, and the reflective surface is located on the end cap along an axis approximately half-way between the first transducer and the second transducer.

37. The ultrasonic sensor system according to claim 33, wherein a distance between a point on an inner end cap surface, located between the first transducer and the second transducer, and an end cap surface is approximately equal to $(\frac{3}{4}n/2)\lambda$, where $\lambda$ is a wavelength of the signal, and n is an integer.

38. The ultrasonic sensor system according to claim 33, wherein a distance between a first transducer surface or a second transducer surface and an end cap surface is approximately equal to $(n/2)\lambda$, where $\lambda$ is a wavelength of the signal, and n is an integer.

39. The ultrasonic sensor system according to claim 33, wherein the signal travels generally in the direction of the fluid flow and the signal is used to measure a rate of the fluid flow, a temperature of the fluid flow, and a cavitation of the fluid flow.

40. The ultrasonic sensor system according to claim 33, wherein the signal travels generally in a direction opposite the direction of the fluid flow signal and the signal is used to measure a rate of the fluid flow, a temperature of the fluid flow, and a cavitation of the fluid flow.

41. The ultrasonic sensor system according to claim 33, wherein the first transducer and the second transducer are oriented at an angle relative to an axis orthogonal to a central axis of a duct.

42. An ultrasonic sensor system, comprising:
  a duct for providing a flow path for a fluid in a flow direction;
  an ultrasonic flow sensor sealingly coupled to the duct, including:
    a first transducer to transmit a signal,
    a second transducer to receive the signal,
    at least one end cap to separate the first transducer and the second transducer from the fluid; and
    a reflecting surface to reflect the signal toward a reflective surface located on the end cap, wherein the reflecting surface is located opposite said reflective surface, the reflective surface lies along an axis approximately half-way between the first transducer and the second transducer, a path of the signal extends generally along a longitudinal axis of the duct parallel to the flow direction, the path extends from the first transducer to the reflecting surface to the reflective surface to the reflecting surface to the second transducer.

43. The ultrasonic sensor system according to claim 42, wherein the reflecting surface is located on a wall of the duct located opposite the first transducer and the second transducer and includes at least one angled surface.

44. The ultrasonic sensor system according to claim 42, wherein the signal travels generally in the direction of the fluid flow and the signal is used to measure a rate of the fluid flow, a temperature of the fluid flow, and a cavitation of the fluid flow.

45. The ultrasonic sensor system according to claim 42, wherein the signal travels generally in a direction opposite the direction of the fluid flow and the signal is used to measure a rate of the fluid flow, a temperature of the fluid flow, and a cavitation of the fluid flow.

46. The ultrasonic sensor system according to claim 42, wherein the first transducer and the second transducer are oriented at an angle relative to an axis orthogonal to a central axis of a duct.

47. The ultrasonic sensor system according to claim 42, wherein the reflecting surface includes a first angled surface and a second angled surface.

48. An ultrasonic sensor system, comprising:
  a duct for providing a flow oath for a fluid in a flow direction;
  an ultrasonic flow sensor sealingly coupled to the duct, including:
    a first transducer to transmit a signal,
    a second transducer to receive the signal, and
    a reflecting surface to reflect the signal toward a reflective surface,
  wherein the reflective surface lies along an axis approximately half-way between the first transducer and the second transducer, a path of the signal extends generally along a longitudinal axis of the duct parallel to the flow direction, the path extends from the first transducer to the reflecting surface to the reflective surface to the reflecting surface to the second transduce, and
  wherein the signal travels generally in the direction of the fluid flow and the signal is used to measure a rate of the fluid flow, a temperature of the fluid flow, and a cavitation of the fluid flow.

49. The ultrasonic sensor system according to claim 48, further including at least one end cap to separate the first transducer and the second transducer from the fluid.

50. The ultrasonic sensor system according to claim 48, wherein the reflecting surface is located on a duct wall.

51. The ultrasonic sensor system according to claim 48, wherein a distance between the reflective surface and a point on an inner end cap surface located between the first transducer and the second transducer is approximately equal to $(\frac{3}{4}n/2)\lambda$, where $\lambda$ is a wavelength of the signal, and n is an integer.

52. The ultrasonic sensor system according to claim 48, wherein a distance between a first transducer surface or a second transducer surface and an end cap surface is approximately equal to $(n/2)\lambda$, where $\lambda$ is a wavelength of the signal, and n is an integer.

53. The ultrasonic sensor system according to claim 48, wherein the signal travels generally in a direction opposite the direction of the fluid flow and the signal is used to measure a rate of the fluid flow, a temperature of the fluid flow, and a cavitation of the fluid flow.

54. The ultrasonic sensor system according to claim 48, wherein the first transducer and the second transducer are oriented at an angle relative to an axis orthogonal to a central axis of a duct.

55. The ultrasonic sensor system according to claim 48, wherein the reflecting surface includes a first angled surface and a second angled surface.

56. A method of determining a flow rate of a fluid in a duct, comprising:
  transmitting a signal from a first transducer through an end cap and a fluid, wherein a path of the signal extends generally along a longitudinal axis of a duct parallel to a direction of fluid flow, and the end cap encloses the first transducer and a second transducer and acts as a barrier to the fluid;
  receiving the signal at the second transducer;
  measuring a first time between transmitting the signal in a forward direction and receiving the signal;
  measuring a second time between transmitting the signal from the second transducer in a reverse direction and receiving the signal at the first transducer; and
  comparing the first time to the second time to determine a flow rate of the fluid.

57. The method according to claim 56, further including reflecting the signal from a reflecting surface.

58. The method according to claim 57, wherein the reflecting surface is located on a wall of the duct.

59. The method according to claim 57, further including reflecting the signal from the reflecting surface to a reflection point located on an end cap surface.

60. The method according to claim 57, wherein the path of the signal extends from the first transducer to the reflecting surface to a reflection point to the reflecting surface to the second transducer, and the reflection point lies along an axis approximately half-way between the the first transducer and the the second transducer.

61. The method according to claim 60, wherein a distance between the reflection point and a point on an inner end can surface located between the first transducer and the second transducer is approximately equal to $(\frac{3}{4}+n/2)\lambda$, where $\lambda$ is a wavelength of the signal, and n is an integer.

62. The method according to claim 60, wherein a distance between the first transducer or the second transducer and an end cap surface is approximately equal to (n/2)λ, where λ is a wavelength of the signal, and n is an integer.

63. The method according to claim 56, wherein the signal travels generally in the direction of the fluid flow and the signal is used to measure a rate of the fluid flow.

64. The method according to claim 56, wherein the signal travels generally in a direction opposite the direction of the fluid flow and the signal is used to measure a rate of the fluid flow.

65. A method of determining the characteristics of a fluid in a duct, comprising:
transmitting a signal through an end cap and a fluid, wherein a path of the signal extends generally along a longitudinal axis of a duct parallel to a direction of fluid flow, and the end cap acts as a barrier to the fluid;
receiving the signal;
measuring a first time between transmitting the signal in a forward direction and receiving the signal;
measuring a second time between transmitting the signal in a reverse direction and receiving the signal;
comparing the first time to the second time to determine a flow rate of the fluid;
converting the first time to a first acoustic velocity or the second time to a second acoustic velocity and calculating the temperature of the fluid; and
measuring the variation in the signal transmitted in the forward direction or the variation in the signal transmitted in the reverse direction to determine a cavitation of the fluid.

66. The method according to claim 65, further including reflecting the signal from a reflecting surface.

67. The method according to claim 66, wherein the reflecting surface is located on a wall of the duct.

68. The method according to claim 66, further including reflecting the signal from the reflecting surface to a reflection point located on an end cap surface.

69. The method according to claim 66, wherein the path of the signal extends from an originating point to the reflecting surface to a reflection point to the reflecting surface to a destination point, and the reflection point lies along an axis approximately half-way between the originating point and the destination point.

70. The method according to claim 69, wherein a distance between the reflection point and a point located between the originating point and the destination point is approximately equal to (¾+n/2)λ, where λ is a wavelength of the signal, and n is an integer.

71. The method according to claim 69, wherein a distance between the originating point or the destination point and an end cap surface is approximately equal to (n/2)λ, where λ is a wavelength of the signal, and n is an integer.

72. The method according to claim 65, wherein the signal travels generally in the direction of the fluid flow and the signal is used to measure the rate of the fluid flow, the temperature of the fluid flow, and the cavitation of the fluid flow.

73. The method according to claim 65, wherein the signal travels generally in a direction opposite the direction of the fluid flow and the signal is used to measure the rate of the fluid flow, the temperature of the fluid flow, and the cavitation of the fluid flow.

74. A method of measuring the characteristics of a fluid in a duct, comprising:
transmitting a signal through a fluid from an originating point;
reflecting the signal from a reflecting surface to a reflection surface to the reflecting surface to a destination point;
receiving the signal at a destination point, wherein the reflection surface lies along an axis approximately half-way between the originating point and the destination point;
measuring a first time between transmitting the signal in a forward direction and receiving the signal;
measuring a second time between transmitting the signal in a reverse direction and receiving the signal;
comparing the first time to the second time to determine a flow rate of the fluid;
converting the first time to a first acoustic velocity or the second time to a second acoustic velocity and calculating the temperature of the fluid; and
measuring the variation in the signal transmitted in the forward direction or the variation in the signal transmitted in the reverse direction to determine a cavitation of the fluid.

75. The method according to claim 74, wherein at least one end cap separates a first transducer and a second transducer from the fluid.

76. The method according to claim 75, wherein a distance between the reflection surface and a point located between the originating point and the destination point is approximately equal to (¾+n/2)λ, where λ is a wavelength of the signal, and n is an integer.

77. The method according to claim 74, wherein a distance between a first transducer surface or a second transducer surface and an end cap surface is approximately equal to (n/2)λ, where λ is a wavelength of the signal, and n is an integer.

78. The method according to claim 74, wherein the reflecting surface is located on a wall of the duct.

79. The method according to claim 74, wherein the signal travels generally in a direction of fluid flow and the signal is used to measure the rate of the fluid flow, the temperature of the fluid flow, and the cavitation of the fluid flow.

80. The method according to claim 74, wherein the signal travels generally in a direction opposite a direction of fluid flow and the signal is used to measure the rate of the fluid flow, the temperature of the fluid flow, and the cavitation of the fluid flow.

81. An ultrasonic flow sensor, comprising:
a first transducer to transmit a signal;
a second transducer to receive the signal; and
at least one end cap enclosing and isolating the first transducer and the second transducer from a fluid, the end cap having a reflective surface located in contact with the fluid to receive the signal from a reflecting surface located opposite said reflective surface, the first transducer and the second transducer spaced apart in a direction parallel to a direction of fluid flow.

82. The ultrasonic flow sensor according to claim 81, wherein the signal transmitted by the first transducer reflects off of the reflective surface.

83. The ultrasonic flow sensor according to claim 82, wherein the signal transmitted by the first transducer reflects off of the reflecting surface on a duct back to the reflective surface of the end cap.

84. The ultrasonic flow sensor according to claim 83, wherein the signal transmitted by the first transducer approximately traverses a W shaped path that extends from the first transducer to the reflecting surface to the reflective surface to the reflecting surface to the second transducer.

85. The ultrasonic flow sensor according to claim 83, wherein the reflecting surface is located on a wall of the duct located opposite the first transducer and the second transducer and includes at least one angled surface.

86. The ultrasonic flow sensor according to claim 81, wherein a distance between the reflective surface and a point on an inner end cap surface located between the first transducer and the second transducer is approximately equal to $(3/4+n/2)\lambda$, where $\lambda$ is a wavelength of the transmitted signal, and n is an integer.

87. The ultrasonic flow sensor according to claim 81, wherein a distance between a first transducer surface or a second transducer surface and an end cap surface is is approximately equal to $(n/2)\lambda$, where $\lambda$ is a wavelength of the transmitted signal, and n is an integer.

88. The ultrasonic flow sensor according to claim 81, wherein the signal travels generally in the direction of the fluid flow and the signal is used to measure a rate of the fluid flow, a temperature of the fluid flow, and a cavitation of the fluid flow.

89. The ultrasonic flow sensor according to claim 81, wherein the signal travels generally in a direction opposite the direction of the fluid flow and the signal is used to measure a rate of the fluid flow, a temperature of the fluid flow, and a cavitation of the fluid flow.

90. The ultrasonic flow sensor according to claim 81, wherein the first transducer and the second transducer are oriented at an angle relative to an axis orthogonal to a central axis of a duct.

* * * * *